M. C. OVERMAN.
TIRE.
APPLICATION FILED SEPT. 25, 1919.

1,340,556.

Patented May 18, 1920.

Inventor
Max Cyrus Overman
By his Attorney
F. W. Scherr Jr.

UNITED STATES PATENT OFFICE.

MAX CYRUS OVERMAN, OF NEW YORK, N. Y.

TIRE.

1,340,556. Specification of Letters Patent. Patented May 18, 1920.

Application filed September 25, 1919. Serial No. 326,205.

*To all whom it may concern:*

Be it known that I, MAX CYRUS OVERMAN, a citizen of the United States, residing at New York, N. Y., have invented certain new and useful Improvements in Tires, of which the following is a specification.

My present invention relates to improvements in tires similar to that shown to prevent or minimize the rushing or roaring sound created by said tire when rolling fast in road-contact.

Figure 1:
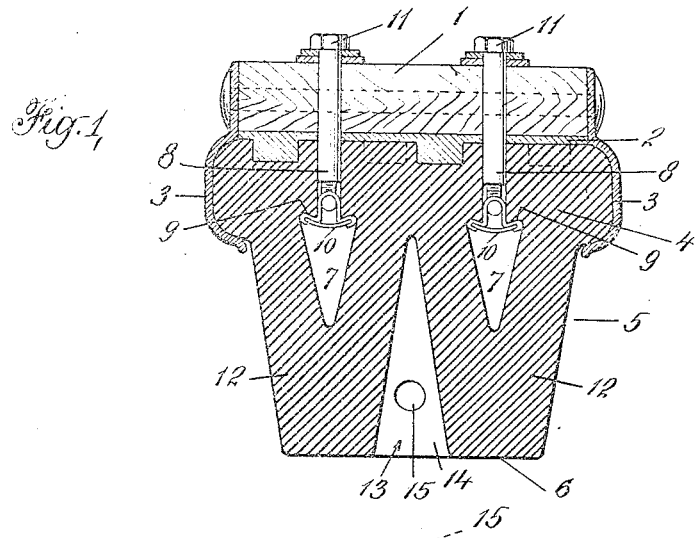
Figure 2:
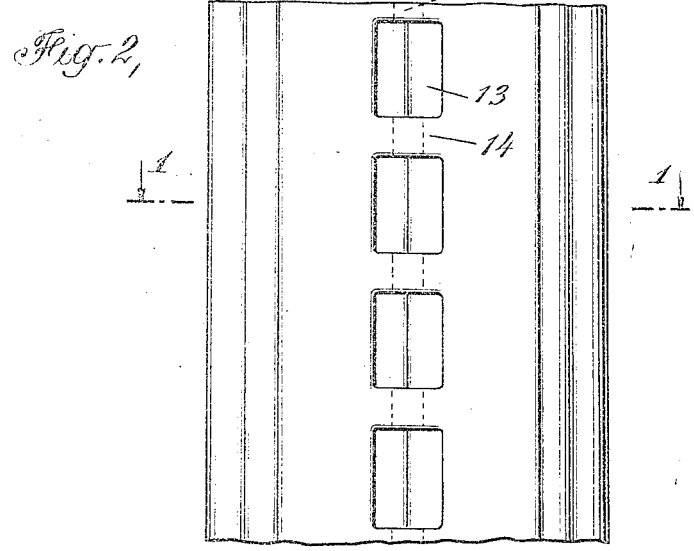

In the drawings, Figure 1 is a cross-sectional view of a flanged wheel-felly with an attached tire to which my present improvement has been applied, said Fig. 1 being a section on the line 1—1 in Fig. 2 looking in the direction of the arrows; and Fig. 2 is an underneath plan view of the tire of Fig. 1.

I will now describe the specific devices of the drawings together with my present improvement set forth in the annexed claims.

In the following, the words "upper" and "lower" and similar expressions of location are intended to refer to a section of the tire positioned as in Fig. 1.

1 is the wheel-felly surrounded by the rim 2. 3—3 are the flanges bolted to the sides of the felly.

The illustrated tire is, of course, intended to be made of rubber or rubber compounds or their equivalent. It comprises a wheel-engaging upper-portion 4 confined between the wheel-rim 2 and the flanges 3—3. Integral with said upper portion of the tire is the lower portion 5 whose bottom 6 is the flat road-engaging tread of the tire. The tire is hollow by means of a plurality of spaced apart openings or hollows 7—7, which are severally substantially V-shaped in cross-section (Fig. 1), with the tops of the V's at the upper portion of the tire and with the bottoms of the V's in the lower portion of the tire directed toward the thread. These hollows 7 extend longitudinally, preferably continuously so, without interruption, around and through the tire in spaced, parallel relationship with each other.

The upper portion of the tire is provided with slots shown in cross-section at 8—8 in Fig. 1 extending upwardly therethrough from the top of the respective V-shaped hollows. Each of these slots extends circumferentially around the inside of the tire. Clamping beads 9 are thereby provided for engagement by a plurality of clamping plates 10 at the top of each hollow of the tire, said plates being adjustably connected with the felly by the bolt means 11 operably projecting through suitably spaced holes in the felly to draw the plates toward the felly to clamp the tire securely to the wheel.

The lower portion 5 of the tire is divided into lateral parts 12—12 by a cleft 13 extending up through it from the tread between the V-shaped hollows substantially to the upper portion 4 of the tire. This cleft extends circumferentially around the tire (Fig. 2) interrupted at intervals by cross-webs or bridges, 14, which unite the aforesaid lateral parts 12—12 of the tire. From Fig. 1 it will be seen that the walls of this cleft diverge outwardly toward the tread of the tire. Also, said cross-webs 14 preferably are sufficiently thick to constitute an important factor in supporting the load and to this end should extend from the apex or top of the recess 13 downwardly until they are flush with the tread of the tire.

The foregoing described tire, in spite of its many good qualities and advantages, produces a roaring sound when in fast rolling-contact with the ground. However, I have discovered that by providing holes 15 through the aforesaid cross-webs 14, I am able to prevent or minimize this disadvantageous noise. Fig. 2 shows these holes extending through all of the cross-webs, although it will ordinarily be sufficient to put them in every other cross-web alternately around the tire.

What I claim is:

1. A tire whose cross-section with the tread downward comprises a wheel-engaging upper portion; and a lower portion whose bottom is the tread of the tire having a substantially flat contact with the road, said lower portion being divided into lateral parts by a cleft extending up through it from the tread, said cleft extending circumferentially around the tire interrupted at intervals by perforated cross-webs uniting said lateral parts flush with the tread of the tire.

2. A tire whose cross-section with the tread downward comprises a wheel-engaging upper portion; and a lower portion whose bottom is the tread of the tire having a substantially flat contact with the road, said lower portion being divided into lateral parts by a cleft extending up through it from the tread, said cleft extending circumferentially around the tire interrupted at intervals by cross-webs uniting said lateral parts flush with the tread of the tire, said cross-webs alternately around the tire being perforated.

MAX CYRUS OVERMAN.